P. H. BORDEN.
DEVICE FOR INDICATING THE CARDINAL POINTS.
APPLICATION FILED MAY 17, 1913.
1,102,219.
Patented June 30, 1914.
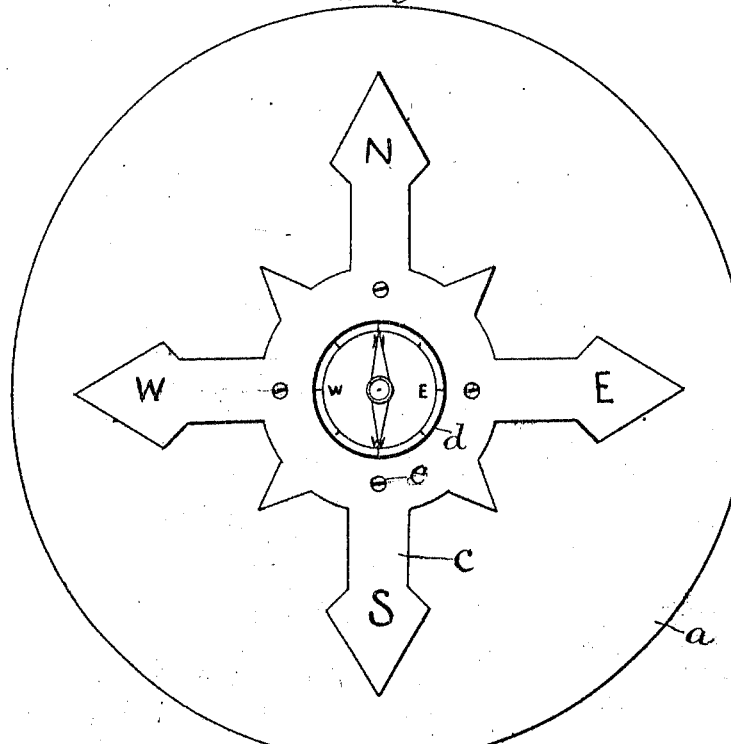
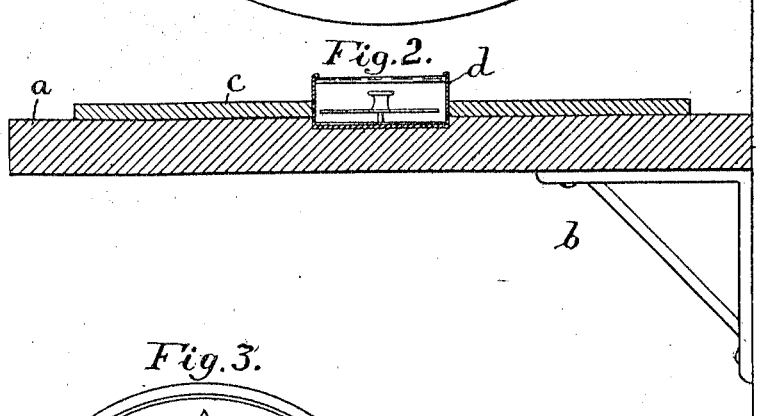
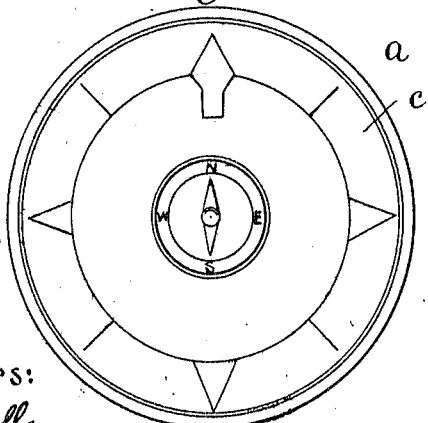
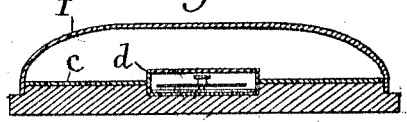

UNITED STATES PATENT OFFICE.

PHILIP H. BORDEN, OF PORTLAND, MAINE.

DEVICE FOR INDICATING THE CARDINAL POINTS.

1,102,219.  Specification of Letters Patent.  Patented June 30, 1914.

Application filed May 17, 1913.  Serial No. 768,226.

*To all whom it may concern:*

Be it known that I, PHILIP H. BORDEN, of Portland, in the county of Cumberland and State of Maine, have invented certain new and useful Improvements in Devices for Indicating the Cardinal Points, of which the following is a specification.

My invention relates to a device for indicating the points of the compass or the cardinal points and for conveniently setting the device so that the cardinal points will be in their true position.

The object of the invention is to provide an indicating device of this character which may be conveniently set up on lawns, verandas and in similar locations and which may be readily set with the cardinal points in their correct position. With this object in view my invention consists of the device hereinafter shown and claimed.

My invention may best be understood by reference to the accompanying drawing in which is shown several different forms of my invention.

In the drawing, Figure 1 is a plan of a simple form of my indicator, Fig. 2 is a central vertical section through the same, Figs. 3 and 4 are two like views of a form in which I make use of a glass protecting dome.

Referring to the form shown in Figs. 1 and 2 *a* represents a suitable base which is here shown as a disk which may be of wood or any suitable material. It may be supported by any suitable means according to the place where it is to be located, whether on the railing of a veranda, the side of a house on an open lawn or any other desired position. As here shown, I represent it as being provided with a bracket *b* by which it may be attached to any vertical surface as the wall of a house. Upon the base *a* rests an indicator *c* which is preferably a flat metal plate provided with projecting points which are spaced 90 degrees apart to represent the cardinal points of the compass. Means are provided for setting the indicator after the base has been fixed in place. For this purpose I form in the center of the indicator an opening adapted to receive a small compass which will serve as a means of setting the indicator and which may subsequently be removed. As here shown, I form in the upper face of the base *a* a recess which corresponds and registers with the opening in the indicator *c*. The opening in the indicator and the recess in the base form a pocket into which may be slipped a compass *d*, and this compass beside serving the purpose of determining the correct position of the indicator serves as a pivot on which it may turn while being adjusted. Means are provided for securing the indicator to the base and as here shown I make use of screws *e* which pass through the indicator and enter the base.

In using the device the base is fastened in any suitable position, the indicator is placed on the base with its opening registering with the recess in the base. The compass is then slipped into the pocket formed by the opening and the recess and the indicator is turned until the north point of the indicator coincides in direction with the north end of the needle. The indicator is then fixed in its position by the screws *e*. The compass may now be removed and the device will always show the cardinal points correctly located.

This apparatus may be located at any convenient place either inside or outside of the house as desired.

In the form shown in Figs. 3 and 4, a glass dome *f* protects the indicator and fits over a shoulder on the base. The weather has little effect on the device when protected by the dome. When located on a lawn or in the open it may be secured to the top of a tripod or standard.

I claim:—

A device for indicating the cardinal points consisting of a base having a recess on its upper face, an indicator on said base having a recess registering with the recess in said base, a compass fitting in said recesses and forming a pivot on which said indicator may be rotated to its proper position and removable means for securing the indicator to the base when the latter is in its proper position.

In testimony whereof I have affixed my signature, in presence of two witnesses.

PHILIP H. BORDEN.

Witnesses:
S. W. BATES,
C. B. CREIGHTON.